Oct. 25, 1955  H. SANDERS  2,721,334
ADJUSTABLE TOILET TANK TRAY PAN AND CLAMP PLATE
Filed Nov. 19, 1952
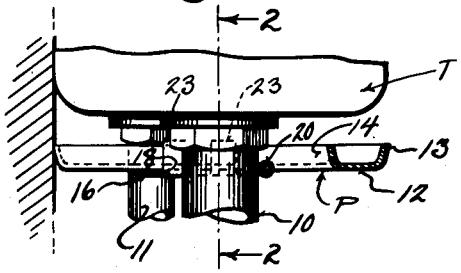
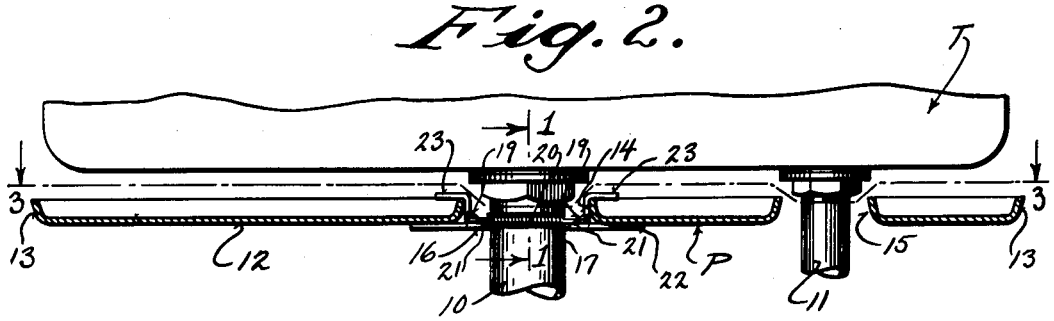
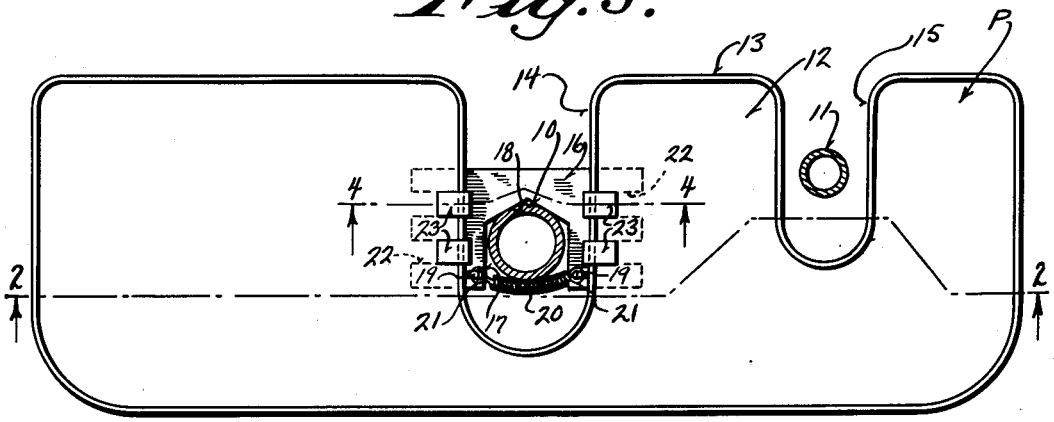
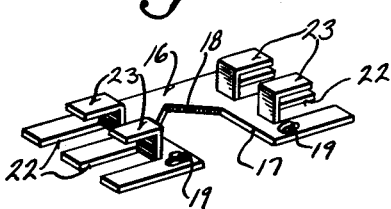
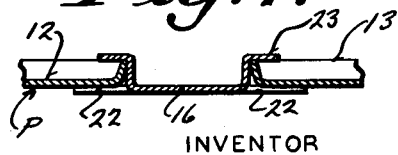
INVENTOR
HARRY SANDERS
BY
*Young & Wright*
ATTORNEYS

United States Patent Office 2,721,334
Patented Oct. 25, 1955

2,721,334

ADJUSTABLE TOILET TANK TRAY PAN AND CLAMP PLATE

Harry Sanders, Milwaukee, Wis.

Application November 19, 1952, Serial No. 321,438

1 Claim. (Cl. 4—252)

This invention appertains to pans or basins for catching water of condensation dripping from the flush tanks of toilet bowls, whereby to prevent injury to floors and floor coverings by water accumulating thereon.

Much difficulty has been experienced in properly securing drip pans in position on the flush tanks and in adjusting the pans relative to the clamping means to the tank, and in all drip pans with which I am familiar, after the pans are once placed in position, the removal of the pans for cleaning by the housewife is a difficult and laborious procedure requiring tools for the opening of clamps and the like, which often become rusted in place.

One of the primary objects of my invention is the provision of novel means for detachably securing a drip pan in proper position under a toilet flush tank, without the use of tools and which will permit the quick and convenient installation of the pan and the removal of the pan for cleaning by the housewife by the mere sliding of the pan off of the clamping member, the construction being such that the pan can be adjusted back and forth on the clamping member, so that the pan can be disposed to the best advantage under the tank.

Another salient object of my invention is the provision of a clamp plate having means for slidably supporting the drip pan, whereby the pan can be adjusted back and forth thereon, the clamp plate itself having a throat for receiving the flush pipe and a contractile coil spring carried by the plate and adapted to extend across the throat for gripping the pipe and for holding certain edges of the clamp plate in biting contact with the pipe.

With these and other objects in view, the invention consists in the novel construction, arrangement and formation of parts, as will be hereinafter more specifically described and claimed, and illustrated in the accompanying drawing, in which drawing:

Figure 1 is a fragmentary transverse sectional view taken on the line 1—1 of Figure 2, showing the pan installed on the flush pipe and under a flush tank.

Figure 2 is a longitudinal sectional view through the pan taken on the line 2—2 of Figure 3, looking in the direction of the arrows, showing the pan in position under the tank and clamped to the flush pipe.

Figure 3 is a horizontal sectional view taken on the line 3—3 of Figure 2, looking in the direction of the arrows and showing the drip pan in top plan.

Figure 4 is a detail vertical sectional view taken on the line 4—4 of Figure 3, looking in the direction of the arrows, and showing the novel formation of the clamp plate for slidably supporting the drip pan.

Figure 5 is a detail perspective view of the clamp plate.

Referring to the drawing in detail, wherein similar reference characters designate corresponding parts throughout the several views, the letter P generally indicates the drip pan for the flush tank T, of a toilet.

The flush tank T forms no part of the present invention, and has merely been shown to illustrate the use of this device and the same has associated therewith in the customary manner, the flush pipe 10 and the water supply pipe 11.

The drip pan P is shaped to conform to the general configuration of the flush tank, and can be formed from any desired material. As illustrated, the pan P includes a bottom wall 12 having a marginal upstanding flange 13. The pan can be provided with other desirable adjuncts (not shown), which form no part of this invention. The rear edge of the body of the pan is provided with throats or slots 14 and 15, so that the pan can be slipped under the tank T around the flush pipe 10, and the water conduit 11. It is to be noted that the marginal flange 13 extends around the edges of the slots 14 and 15, and the flange 13 extending around the edge or wall of the throat or slot 14 cooperates with a part of the novel clamping means which will now be described.

The clamping means includes a clamp plate 16, preferably, but not necessarily, formed from sheet metal and the forward edge of this plate is provided with a notch or throat 17 for receiving the flush pipe 10 of the tank T, as will be later set forth. The inner end of the throat or slot 17, is tapered to provide oppositely inclined walls 18 which intimately engage the pipe 10. On each side of the slot or throat 17 and at the mouth thereof, the plate is provided with struck-up ears or hooks 19, which constitute the anchoring means for a contractile coil spring 20, which is adapted to normally extend straight across the throat and the ends of the spring 20 are provided with eyes 21 which are slipped over the ears or hooks 19.

The side edges of the plate are provided with inwardly directed slots 22, and the material from these slots is bent upwardly and outwardly to form guide tongues 23. The tongues 23 are spaced from the body portion of the plate in such a manner that the marginal flange 13 surrounding the throat 14 is slidably received between the tongues and the body of the plate. By referring to Figures 2, 3 and 4, it can be seen that the slotted edges of the plate 16 extend under the bottom surface of the bottom wall 12 of the pan P.

In use of this device, one eye 21 of the spring 20 is unhooked from one ear or hook 19, and the clamp plate 16 is placed on the pipe 10 and the pipe is received within the throat or notch 17. At this time, the contractile coil spring 20 can be stretched and the eye rehooked over the hook or ear 19. This will draw this spring into tight engagement with the front of the pipe and pull the inclined edges 18 of the slot or throat 14 into frictional engagement with the pipe. Thus the plate is firmly held on the pipe. The pan can now be slid between the tongues 23 and the body portion of the plate 16, and the pan is adjusted back and forth on the plate until the desired position of the same is reached relative to the tank.

From the foregoing description, it can be seen that no tools are necessary to install the pan P under the tank T and that the same can be adjusted relative to the tank independent of its supporting or clamping member.

Changes in details may be made without departing from the spirit or the scope of this invention, but what I claim as new is:

A drip pan attachment for the flush tank of toilets comprising a drip pan body adapted to fit under the flush tank having inwardly directed slots opening out through the rear edge of the pan for receiving pipes depending from the flush tank, the walls of the body being provided with marginal flanges, a clamp plate including a flat body portion having a throat adapted to receive one of the pipes, means securing the clamp plate to said pipe, and tongues struck up from the side edges of the clamp plate and having horizontal portions overlying the body portion of the clamp plate and defining guideways in conjunction with the body portion of the plate for receiving the marginal flanges formed on the side walls of the slot receiving the pipe engaged by the clamp plate, and said body portion of said flat clamp plate terminating well beyond the outer end of said tongues and extending under the drip pan body to form a support for the same.

References Cited in the file of this patent

UNITED STATES PATENTS

| | | |
|---|---|---|
| 2,180,902 | Herodes et al. | Nov. 21, 1939 |
| 2,575,130 | Rubner | Nov. 13, 1951 |
| 2,632,181 | Kass | Mar. 24, 1953 |